United States Patent
Iwasaki et al.

(10) Patent No.: US 11,345,982 B2
(45) Date of Patent: May 31, 2022

(54) SHAFT PART

(71) Applicant: NIPPON STEEL & SUMITOMO METAL CORPORATION, Tokyo (JP)

(72) Inventors: Tatsuya Iwasaki, Tokyo (JP); Koji Watari, Tokyo (JP); Hidekazu Sueno, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 537 days.

(21) Appl. No.: 16/330,655

(22) PCT Filed: Sep. 20, 2017

(86) PCT No.: PCT/JP2017/033984
§ 371 (c)(1),
(2) Date: Mar. 5, 2019

(87) PCT Pub. No.: WO2018/056332
PCT Pub. Date: Mar. 29, 2018

(65) Prior Publication Data
US 2021/0285078 A1 Sep. 16, 2021

(30) Foreign Application Priority Data

Sep. 20, 2016 (JP) .............................. JP2016-183159

(51) Int. Cl.
*C22C 38/06* (2006.01)
*C22C 38/00* (2006.01)
(Continued)

(52) U.S. Cl.
CPC ................ *C22C 38/06* (2013.01); *C21D 1/10* (2013.01); *C21D 1/28* (2013.01); *C21D 9/28* (2013.01);
(Continued)

(58) Field of Classification Search
None
See application file for complete search history.

(56) References Cited

FOREIGN PATENT DOCUMENTS

| EP | 3336206 A1 | 6/2018 |
|---|---|---|
| JP | 2001-262230 A | 9/2001 |

(Continued)

OTHER PUBLICATIONS

Chinese Office Action for Chinese Application No. 201780056261.7, dated Mar. 25, 2020, with English translation.
(Continued)

*Primary Examiner* — Xiaobei Wang
(74) *Attorney, Agent, or Firm* — Birch, Stewart, Kolasch & Birch, LLP

(57) ABSTRACT

A shaft part excellent in static torsional strength and torsional fatigue strength containing, by mass %, essential elements of C: 0.35 to 0.70%, Si: 0.01 to 0.40%, Mn: 0.5 to 2.6%, P: 0.050% or less, S: 0.005 to 0.020%, Al: 0.010 to 0.050%, N: 0.005 to 0.025%, and O: 0.003% or less, further containing optional elements, having a balance of Fe and impurities, having a chemical composition satisfying formula (1), having at least one hole at an outer circumferential surface, having a volume ratio (R1) of 4 to 20% of retained austenite at a position of a 2 mm depth from the outer circumferential surface, having a volume ratio of retained austenite at a position of a 2 mm depth from the outer circumferential surface in an axial direction of the hole and at a position of a 20 μm depth from the surface of the hole as R2, and having a reduction rate Δγ of 40% or more of retained austenite found by the formula (A): $\Delta\gamma=[(R1-R2)/R1]\times 100$: Formula (1): $15.0 \leq 25.9C+6.35Mn+2.88Cr+3.09Mo+2.73Ni \leq 27.2$ (Notations of elements in formula are contents of the elements).

3 Claims, 3 Drawing Sheets

(51) Int. Cl.
　　　*C22C 38/02*　　(2006.01)
　　　*C22C 38/04*　　(2006.01)
　　　*C22C 38/08*　　(2006.01)
　　　*C22C 38/12*　　(2006.01)
　　　*C22C 38/14*　　(2006.01)
　　　*C22C 38/16*　　(2006.01)
　　　*C22C 38/26*　　(2006.01)
　　　*C22C 38/54*　　(2006.01)
　　　*C22C 38/60*　　(2006.01)
　　　*F16C 3/02*　　(2006.01)
　　　*C21D 1/10*　　(2006.01)
　　　*C21D 1/28*　　(2006.01)
　　　*C21D 9/28*　　(2006.01)

(52) U.S. Cl.
　　　CPC .......... *C22C 38/001* (2013.01); *C22C 38/002* (2013.01); *C22C 38/02* (2013.01); *C22C 38/04* (2013.01); *C22C 38/08* (2013.01); *C22C 38/12* (2013.01); *C22C 38/14* (2013.01); *C22C 38/16* (2013.01); *C22C 38/26* (2013.01); *C22C 38/54* (2013.01); *C22C 38/60* (2013.01); *F16C 3/02* (2013.01); *C21D 2211/001* (2013.01); *C21D 2211/008* (2013.01)

(56) References Cited

FOREIGN PATENT DOCUMENTS

| | | |
|---|---|---|
| JP | 2004-27334 A | 1/2004 |
| JP | 2006-111962 A | 4/2006 |
| JP | 2006-342904 A | 12/2006 |
| JP | 2007-131871 A | 5/2007 |
| JP | 2009-197314 A | 9/2009 |
| JP | 2017-82299 A | 5/2017 |
| WO | WO 2017/026307 A1 | 2/2017 |

OTHER PUBLICATIONS

International Preliminary Report on Patentability and Written Opinion of the International Searching Authority (forms PCT/IB/373, PCT/ISA/237 and PCT/IB/326), dated Apr. 4, 2019, for corresponding International Application No. PCT/JP2017/033984, with a Written Opinion translation.

International Search Report (form PCT/ISA/210), dated Dec. 26, 2017, for corresponding International Application No. PCT/JP2017/033984, with an English translation.

SHAFT PART

FIELD

The present invention relates to a shaft part, more particularly relates to an induction hardened shaft part.

BACKGROUND

A shaft part used in an automobile or industrial machine (for example, a transmission shaft) is sometimes treated to harden its surface by induction hardening or carburizing and quenching.

As the method of producing a hardened shaft part, there is for example the following method: That is, first, a workpiece of a shape close to the final product is produced. Next, a hole is formed by drilling, etc., in order to produce a semifinished part further closer to the final product. Further, finally, the semifinished part is hardened (induction hardened or carburized and quenched) to obtain the shaft part.

Usually, a shaft part is formed with various holes such as an oil hole. The area surrounding a hole is the portion which is the weakest in strength in the part. Therefore, to enhance the strength of a shaft part having a hole, it is necessary to reliably strengthen the hole and its surroundings. A technique for enhancing the torsional fatigue strength of a shaft part is disclosed in Patent Literature (PTL) 1 and PTL 2.

PTL 1 discloses a crankshaft with high torsional fatigue strength using induction hardening to form a quench hardened layer at an opening of an oil hole.

PTL 2 discloses a shaft excellent in fatigue resistance characterized in that a retained stress of compression at a surface layer of an oil hole is 50% to 90% of the tensile strength of the steel material and discloses a method of improving that fatigue strength.

CITATION LIST

Patent Literature

[PTL 1] Japanese Unexamined Patent Publication No. 2001-262230
[PTL 2] Japanese Unexamined Patent Publication No. 2006-111962

SUMMARY

Technical Problem

In this regard, in recent automobiles and industrial machines, for improving the fuel efficiency, smaller size and lighter weight are being strongly demanded. In the midst of all of this, further improvement of the torsional fatigue strength and excellent static torsional strength are being demanded from shaft parts. However, in the shaft part obtained by the technique disclosed in PTL 1, fatigue cracks occur starting from the surface of an oil hole, in particular at the boundary part where hardening is performed, the so-called "hardening boundary", so major improvement in the fatigue strength is difficult. Furthermore, due to the inappropriate constituents of the steel material and the inappropriate structure of the surface layer, sometimes achieving both static torsional strength and torsional fatigue strength is difficult.

In the technique disclosed in PTL 2, an ultrasonic vibration terminal is used to strike the inside of an oil hole to cause the generation of residual stress of compression at the inside surface of the oil hole and thereby strengthen the hardened boundary. However, with striking by an ultrasonic vibration terminal, it is difficult to perform even treatment over the entire oil hole and there is the possibility that the target strength cannot always be obtained. Furthermore, due to the inappropriate constituents of the steel material and the inappropriate structure of the surface layer, sometimes achieving both static torsional strength and torsional fatigue strength is difficult.

As a technique for strengthening an oil hole, in addition to striking the hole by an ultrasonic vibration terminal disclosed in PTL 2, treatment to improve the surface by shot peening may also be considered. However, both of these processes require different facilities and apparatuses than normal processes are disadvantageous economically due to resulting in rising costs.

The present invention was made in consideration of the above situation and has as its object the provision of a shaft part excellent in static torsional strength and torsional fatigue strength.

Solution to Problem

The inventors engaged in intensive studies on a shaft part able to achieve both static torsional strength and torsional fatigue strength and a method of producing the shaft part. As a result, the inventors found that by not forming a hole before induction hardening as is the usual practice, but forming a hole by machining after induction hardening, the hardness near the hole rises and the occurrence and progression of cracks are suppressed, so the static torsional strength and torsional fatigue strength of the shaft part are improved. Further, they found that if transforming much of the retained austenite to deformation-induced martensite at the time of machining, the static torsional strength and torsional fatigue strength of the shaft part are improved much more.

Usually, to control the behavior in transformation to deformation-induced martensite at the time of machining, optimizing the machining conditions is effective. For this reason, the inventors experimented with optimization of the machining conditions so as to increase as much as possible the amount of transformation to martensite. However, with optimizing just the machining conditions, while the static torsional strength and torsional fatigue strength of the shaft part are indeed improved, this does not lead to the targeted values being reached.

Therefore, the inventors took notice of the chemical constituents of the steel material and heat treatment conditions as well to try to further improve the static torsional strength and torsional fatigue strength. As a result, they found that by employing specific steel material constituents and heat treatment conditions, deformation-induced martensite transformation more easily occurs at the time of machining and the static torsional strength and torsional fatigue strength of the shaft part are remarkably improved.

In the past, the general practice had been to employ specific chemical constituents of the steel material and heat treatment conditions to control the amount of retained austenite. However, optimizing the chemical constituents of the steel material and heat treatment conditions so as to control not only the amount of retained austenite but also the behavior of deformation-induced martensite transformation at the time of machining is a novel technical idea not found up to now.

Due to the above, the inventors obtained the learning that to dramatically improve the static torsional strength and torsional fatigue strength of a shaft part, rather than individually optimizing the chemical constituents of the steel material, heat treatment conditions, and machining conditions, it is desirable to organically optimize these conditions linked with each other.

Further, the inventors obtained the learning that by organically optimizing the chemical constituents of the steel material, heat treatment conditions, and machining conditions, the structure after induction hardening and the structure after machining are suitably controlled and in turn a shaft part improved to a good balance of the static torsional strength and torsional fatigue strength is obtained. Based on the above learning, the inventors perfected a shaft part excellent in static torsional strength and torsional fatigue strength. The gist of this is as follows:

[1] A shaft part containing, by mass %, C: 0.35 to 0.70%, Si: 0.01 to 0.40%, Mn: 0.5 to 2.6%, S: 0.005 to 0.020%, Al: 0.010 to 0.050%, and N: 0.005 to 0.025%, containing, as impurity elements, P: 0.050% or less and O: 0.003% or less and, further, as optional elements, Pb: 0.5% or less, one or more elements selected from the group consisting of V, Nb, and Ti: 0.1% or less in total content, one or more of elements selected from the group consisting of Cr: 3.0% or less, Mo: 3.0% or less, and Ni: 3.0% or less, Cu: 0 to 0.50%, and B: 0 to 0.020%, having a balance of Fe and impurities, and having a chemical composition satisfying formula (1), having at least one hole at an outer circumferential surface, having a volume ratio (R1) of 4 to 20% of retained austenite at a position of a 2 mm depth from the outer circumferential surface and at 2 mm depth from the surface of the hole, and having a reduction rate $\Delta\gamma$ of 40% or more of retained austenite found by the formula (A): $\Delta\gamma=[(R1-R2)/R1]\times 100$ from the R1 and a volume ratio (R2) of retained austenite at a position of a 2 mm depth from the outer circumferential surface in an axial direction of the hole and at a position of a 20 μm depth from the surface of the hole:

$$15.0 \leq 25.9C+6.35Mn+2.88Cr+3.09Mo+2.73Ni \leq 27.2 \quad (1)$$

wherein the contents (mass %) of the elements are entered in the notations of the elements in formula (1).

[2] The shaft part according to [1], wherein the shaft has a plastic flow layer of a thickness of 0.5 to 15 μm at the surface of the hole.

Advantageous Effects of Invention

In the method of producing the shaft part of the present invention, improvements are made particularly to the structure of the steel material after hardening and the structure of the shaft part after forming a hole predicated on the chemical composition of the workpiece, which is a material of the shaft part, being adjusted. As a result, it is possible to obtain a shaft part excellent in static torsional strength and torsional fatigue strength.

BRIEF DESCRIPTION OF DRAWINGS

FIG. 1(a) is a schematic view of a hardened workpiece or a final form of a shaft part, while FIG. 1(b) is a view showing a cross-section A-A' cut vertical to a longitudinal direction of the shaft part.

FIG. 3(a) is a schematic view of a shaft part, while FIG. 3(b) is a view showing a cross-section C-C' cut vertical to an axial direction of the hole at a position of a 2 mm depth from the outer circumference of the shaft part in the axial direction of the hole.

DESCRIPTION OF EMBODIMENTS

Figure 1:
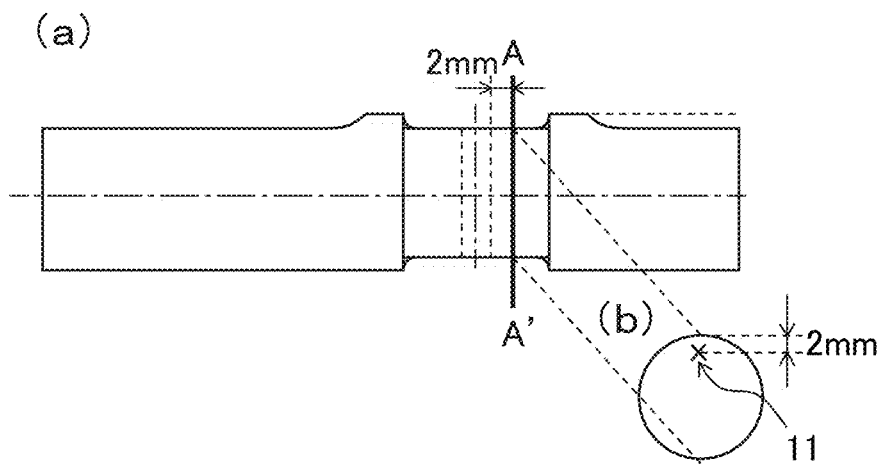

Below, referring to the drawings, a shaft part according to an embodiment of the present invention will be explained in detail. Note that in the figures, the same or corresponding members will be assigned the same notations and explanations will not be repeated.

<Shaft Part>

A shaft part according to an embodiment of the present invention contains, by mass %, C: 0.35 to 0.70%, Si: 0.01 to 0.40%, Mn: 0.5 to 2.6%, S: 0.005 to 0.020%, Al: 0.010 to 0.050%, and N: 0.005 to 0.025%, as impurity elements, P: 0.050% or less and O: 0.003% or less and, further, as optional elements, Pb: 0.5% or less, one or more elements selected from the group consisting of V, Nb, and Ti: 0.1% or less in total content, one or more of elements selected from the group consisting of Cr: 3.0% or less, Mo: 3.0% or less, and Ni: 3.0% or less, Cu: 0 to 0.50%, and B: 0 to 0.020%, has a balance of Fe and impurities, and has a chemical composition satisfying formula (1):

$$15.0 \leq 25.9C+6.35Mn+2.88Cr+3.09Mo+2.73Ni \leq 27.2 \quad (1),$$

has at least one hole at an outer circumferential surface, has a volume ratio (R1) of 4 to 20% of retained austenite at a position of a 2 mm depth from the outer circumferential surface and at 2 mm depth from the surface of the hole, and has a reduction rate $\Delta\gamma$ of 40% or more of retained austenite found by the formula (A): $\Delta\gamma=[(R1-R2)/R1]\times 100$ from the R1 and a volume ratio (R2) of retained austenite at a position of a 2 mm depth from the outer circumferential surface in an axial direction of the hole and at a position of a 20 μm depth from the surface of the hole.

The shaft part according to an embodiment of the present invention includes shaft parts used for automobiles and industrial machines, for example, transmission shafts. The preferable shape of the shaft part is a hollow or solid tubular shaped or rod shaped part with a diameter of 150 mm or less and a length of 5 mm or more.

[Chemical Composition of Shaft Part (Essential Constituents)]

The shaft part has the following chemical composition. Note that the ratios (%) of the elements shown below all mean mass %.

C: 0.35 to 0.70%

Carbon (C) enhances the strength of a shaft part (in particular the strength of the core part). C furthermore produces retained austenite for enhancing the static torsional strength and torsional fatigue strength of the shaft part. If the C content is too low, these effects cannot be obtained. On the other hand, if the C content is too high, the strength of the steel material for being worked to a shaft part becomes too high. For this reason, the machinability of the steel material falls. Furthermore, the strain generated at the time of induction hardening increases and hardening cracks are formed. Therefore, the C content is 0.35% to 0.70%. The preferable lower limit of the C content is 0.40% or more. The preferable upper limit of the C content is less than 0.65%.

Si: 0.01 to 0.40%

Silicon (Si) has the action of enhancing the hardening ability, but at the time of carburizing, ends up increasing the carburized abnormal layer. In particular, if the Si content exceeds 0.40%, the carburized abnormal layer greatly increases, so a soft structure called an "incompletely hardened structure" is formed and the torsional fatigue strength of the shaft part falls. To prevent the formation of the carburized abnormal layer, the content of Si is preferably made 0.30% or less, more preferably is made 0.20% or less. However, in mass production of steel, it is difficult to make the content of Si less than 0.01%. Therefore, the content of Si was made 0.01 to 0.40%. Note that if considering the manufacturing costs in mass production of steel, in the actually produced parts of the present invention, the Si content will probably often be 0.05% or more.

Mn: 0.5 to 2.6%

Manganese (Mn) enhances the hardening ability of the steel material to be worked to a shaft part and makes the amount of the retained austenite in the steel material increase. Austenite containing Mn is more readily transformed to deformation-induced martensite compared with austenite not containing Mn at the time of machining a hole after induction hardening. As a result, the static torsional strength and torsional fatigue strength of the shaft part rise. If the Mn content is too low, these effects cannot be obtained. On the other hand, if the Mn content is too high, the amount of the retained austenite after induction hardening becomes excessively high. For this reason, sufficient deformation-induced martensite transformation will not occur at the time of machining the hole, the amount of the retained austenite will become excessive even after machining, and in turn sufficient deformation-induced martensite transformation will not occur at the time of machining and the amount of the retained austenite will be hard to reduce even after machining. As a result, the static torsional strength and torsional fatigue strength of the machined shaft part will fall. Therefore, the Mn content is 0.5 to 2.6%. The preferable lower limit of the Mn content is 0.8%, while the more preferable one is 1.4%. The preferable upper limit of the Mn content is 2.0%.

P: 0.050% or Less

Phosphorus (P) is an impurity. P segregates at the grain boundaries and lowers the grain boundary strength. As a result, the static torsional strength and torsional fatigue strength of the shaft part fall. Therefore, the P content is 0.050% or less. The preferable upper limit of the P content is 0.030%. The P content should be as low as possible. The preferable lower limit of the P content is 0.0002%.

S: 0.005 to 0.020%

Sulfur (S) bonds with Mn to form MnS and enhances the machinability of the steel material. If the S content is too low, this effect cannot be obtained. On the other hand, if the S content is too high, coarse MnS grains are formed and the hot workability and cold workability of the steel material and the torsional fatigue strength of the shaft part fall. Therefore, the S content is 0.005 to 0.020%. The preferable lower limit of the S content is 0.008%. The preferable upper limit of the S content is 0.015%.

Al: 0.010 to 0.050%

Aluminum (Al) is an element which deoxidizes steel. Al furthermore bonds with N to form MN and refines the crystal grains. As a result, the static torsional strength and torsional fatigue strength of the shaft part rise. If the Al content is too low, these effects cannot be obtained. On the other hand, if the Al content is too high, hard, coarse $Al_2O_3$ is formed, the machinability of the steel material falls, and furthermore the torsional fatigue strength of the shaft part also falls. Therefore, the Al content is 0.010 to 0.050%. The preferable lower limit of the Al content is 0.020%. The preferable upper limit of the Al content is 0.040%.

N: 0.005 to 0.025%

Nitrogen (N) forms nitrides to refine the crystal grains and enhance the static torsional strength and torsional fatigue strength of the shaft part. If the N content is too low, these effects cannot be obtained. On the other hand, if the N content is too high, coarse nitrides are formed and toughness of the steel material falls. Therefore, the N content is 0.005 to 0.025%. The preferable lower limit of the N content is 0.010%. The preferable upper limit of the N content is 0.020%.

O: 0.003% or Less

Oxygen (O) is an impurity. O bonds with Al to form hard oxide-based inclusions. The oxide-based inclusions cause the machinability of the steel material to fall and also cause the torsional fatigue strength of the shaft part to fall. Therefore, the O content is 0.003% or less. The lower the O content the better. The preferable lower limit of the O content is 0.0001%.

The balance of the chemical composition of the steel material consists of iron (Fe) and impurities. "Impurities" mean constituents entering from the ore or scraps utilized as raw materials for the steel material or from the environment of the production process and the like and not constituents intentionally included in the steel material.

[Chemical Composition of Shaft Part (Optional Constituents)]

The steel material to be worked into the shaft part may also contain Pb in place of part of the Fe.

Pb: 0.5% or Less

Lead (Pb) is an optional element and may be included or not included. If included, reduction in the tool wear at the time of machining and an improvement in the scrap disposability are achieved. However, if the Pb content is too high, the strength and toughness of the steel material fall and the static torsional strength and torsional fatigue strength of the shaft part fall. Therefore, the Pb content is preferably made 0.5% or less. The more preferable upper limit of the Pb content is 0.4%. Note that to obtain the above effects, the Pb content is preferably made 0.03% or more.

The steel material to be worked into the shaft part may also contain one or more elements selected from the group consisting of V, Nb, and Ti in place of part of the Fe.

V, Nb, and Ti: 0.1% or Less in Total Content

Vanadium (V), niobium (Nb), and titanium (Ti) are optional elements and may be included or may not be included. These elements bond with C and N to form precipitates. The precipitates of these elements assist the refinement of the crystal grains at the hardened workpieces formed by AlN. The precipitates of these elements enhance the static torsional strength and torsional fatigue strength of the shaft part. However, if the total content of these elements exceeds 0.1%, the precipitates coarsen and the torsional fatigue strength falls. Therefore, the total content of V, Nb, and Ti is preferably 0.1% or less. If one or more of any of V, Nb, and Ti are included as optional elements, the above effect is obtained. The more preferable upper limit of the total content of V, Nb, and Ti is 0.08%. To obtain the above effects by V, Nb, and Ti, inclusion of 0.01% or more is preferable.

The steel material to be worked into the shaft part may furthermore also contain one or more elements selected from the group consisting of Cr, Mo, and Ni instead of part of the Fe. These elements all enhance the hardening ability of the steel material and increase the amount of the retained austenite.

Cr: 3.0% or Less

Chrome (Cr) is an optional element and need not be included. Cr enhances the hardening ability of the steel material and furthermore increases the amount of the retained austenite. However, if the Cr content is too high, the amount of the retained austenite after induction hardening becomes excessively high. In this case, sufficient work-induced martensite transformation does not occur at the time of machining and the amount of the retained austenite is hard to decrease even after machining. As a result, the static torsional strength and torsional fatigue strength of the shaft part fall. Therefore, the Cr content is preferably 3.0% or less. To obtain the above effect by Cr, inclusion of 0.1% or more is preferable. The preferable upper limit of the Cr content is 2.0%.

Mo: 3.0% or Less

Molybdenum (Mo) is an optional element and need not be included. If included, Mo enhances the hardening ability of the steel material and makes the amount of the retained austenite increase. Mo furthermore enhances the resistance to temper softening and enhances the static torsional strength and torsional fatigue strength of the shaft part. However, if the Mo content is too high, the amount of the retained austenite after induction hardening becomes excessive. In this case, sufficient deformation-induced martensite transformation does not arise at the time of machining. As a result, the static torsional strength and torsional fatigue strength of the shaft part fall. Therefore, the Mo content is preferably 3.0% or less. The more preferable upper limit of the Mo content is 2.0%. To obtain the above effect by Mo, inclusion of 0.1% or more is preferable.

Ni: 3.0% or Less

Nickel (Ni) is an optional element and need not be included. If included, Ni enhances the hardening ability of the steel material and increases the amount of the retained austenite. Ni further enhances the toughness of the steel material. However, if the Ni content is too high, the amount of the retained austenite after induction hardening becomes excessive. In this case, sufficient deformation-induced martensite transformation does not occur at the time of machining after hardening. As a result, the static torsional strength and torsional fatigue strength of the shaft part fall. Therefore, the Ni content is preferably 3.0% or less. The more preferable upper limit of the Ni content is 2.0%. To obtain the above effect by Ni, inclusion of 0.1% or more is preferable.

Cu: 0 to 0.50%

Cu dissolves into a solid solution in martensite to enhance the strength of the steel material. For this reason, the fatigue strength of the steel material rises. However, if the Cu content is too high, the element segregates at the grain boundaries of the steel at the time of hot forging and induces hot cracking. Therefore, the Cu content is 0.50% or less. Note that the Cu content is preferably 0.40% or less, more preferably 0.25% or less. To obtain the above effect by Cu, inclusion of 0.10% or more is preferable.

B: 0 to 0.020%

B has the effect of suppressing the grain boundary segregation of P and enhancing the toughness. However, if adding 0.020% or more, abnormal grain growth occurs at the time of carburizing and the torsional fatigue strength falls. Therefore, the B content is 0.020% or less.

Note that, the B content is preferably 0.015%, more preferably 0.010% or less. To obtain the above effect by B, inclusion of 0.0005% or more is preferable.

Note that the shaft part according to the present invention sometimes includes minute amounts of elements other than the above in its chemical composition as impurities. In this case as well, the object of the present invention can be achieved. As specific examples, the shaft part according to the present invention can include the elements shown below in the respectively stipulated ranges:

Rare earth metals (REM): 0.0005% or less,
Calcium (Ca): 0.0005% or less,
Magnesium (Mg): 0.0005% or less,
Tungsten (W): 0.001% or less,
Antimony (Sb): 0.001% or less,
Bismuth (Bi): 0.001% or less,
Cobalt (Co): 0.001% or less,
Tantalum (Ta): 0.001% or less,

[Relationship of Contents of Elements]

The relationship of contents of the elements forming the steel material to be worked into a shaft part satisfies the formula (1) shown below:

$$15.0 \leq 25.9C + 6.35Mn + 2.88Cr + 3.09Mo + 2.73Ni \leq 27.2 \tag{1}$$

wherein the contents (mass %) of the elements are entered in the notations of the corresponding elements in formula (1).

Regarding Formula (1)

In formula (1), F1=25.9C+6.35Mn+2.88Cr+3.09Mo+2.73Ni is defined. The F1 value is a parameter showing the stability of austenite. Formula (1) is an empirical formula found by multiple regression analysis from the measurement values of the retained γ volume ratio of hardened steel of various chemical constituents. If the F1 value is too low, the austenite becomes unstable thermodynamically. After induction hardening, retained austenite is not sufficiently formed and the static torsional strength and torsional fatigue strength of the shaft part fall. On the other hand, if the F1 value is too high, the stability of the austenite rises and the amount of the retained austenite after induction hardening excessively increases. In this case, at the time of machining, deformation-induced martensite transformation becomes hard to secure. For this reason, the static torsional strength and torsional fatigue strength of the shaft part fall. Therefore, F1 is 15.0 to 27.2. The preferable lower limit of F1 is 16.5, while the preferable upper limit is 27.0 or less.

[Hole at Outer Circumferential Surface of Shaft]

The shaft part according to an embodiment of the present invention has a through hole or non-through hole vertical to or having a certain angle with respect to the longitudinal direction of the shaft part, which is opened from the outer circumferential surface of the shaft. The hole diameter is 0.2 mm to 10 mm. The shaft part has one or more of these holes.

[Volume Ratio (R1) of Retained Austenite at Position of 2 mm Depth from Outer Circumferential Surface and at 2 mm Depth from Surface of Hole]

Due to induction hardening of the shaft part, retained austenite forms at the surface layer of the shaft part (including position of a 2 mm depth of from outer circumferential surface). This retained austenite transforms to deformation-induced martensite near a hole when forming a hole after hardening the shaft part. Specifically, when forming a hole, due to the frictional force between the cutting tool and base material, part of the retained austenite near the surface layer of the hole transforms to deformation-induced martensite. On the other hand, deformation-induced martensite transformation due to this action is limited to near a hole. If away from the surface of the hole by about 2 mm, deformation-induced martensite transformation will no longer occur along with formation of a hole. Therefore, the volume ratio (R1) of retained austenite at a position of a 2 mm depth from the outer circumferential surface and 2 mm depth from the surface of the hole is something not affected by a hole forming step after hardening and can be considered the volume ratio of retained austenite before machining.

As a result of the deformation-induced martensite transformation accompanying a hole forming step, the strength of the shaft part rises and the static torsional strength and torsional fatigue strength rise. To obtain such effects, the maximum volume ratio (R1) of retained austenite after hardening has to be 4% or more.

On the other hand, retained austenite is soft, so if (R1) exceeds 20%, conversely the strength of the shaft part will fall.

[Volume Ratio (R2) of Retained Austenite at Position of 2 mm Depth from Outer Circumferential Surface in Axial Direction of Hole and at Position of 20 μm Depth from Surface of Hole]

The volume ratio (R2) of retained austenite at a position of a 2 mm depth from the outer circumferential surface of the shaft part in the axial direction of the hole and at a position of a 20 μm depth from the surface of the hole is the volume ratio of retained austenite near the surface formed by the hole forming step and can be considered the volume ratio of retained austenite after machining. If the volume ratio of the retained austenite after machining is too high, hard martensite is not obtained and the static torsional strength and torsional fatigue strength fall.

[Reduction Rate Δγ of Retained Austenite Found from R1 and R2 by Formula (A): Δγ=[(R1−R2)/R1]×100]

from R1 and R2, the reduction rate of retained austenite (Δγ) found by the above Formula (A) is 40% or more.

The reduction rate (Δγ) of retained austenite expresses the extent of deformation-induced martensite transformation at the time of machining. If Δγ is high, it means that a large amount of deformation-induced martensite transformation occurs due to machining. The static torsional strength and torsional fatigue strength of the shaft part are improved. To obtain such an effect, Δγ has to be 40% or more. Note that the preferable value of Δγ is 42% or more.

[Thickness of Plastic Flow Layer at Surface of Hole: 0.5 to 15 μm]

Figure 3:
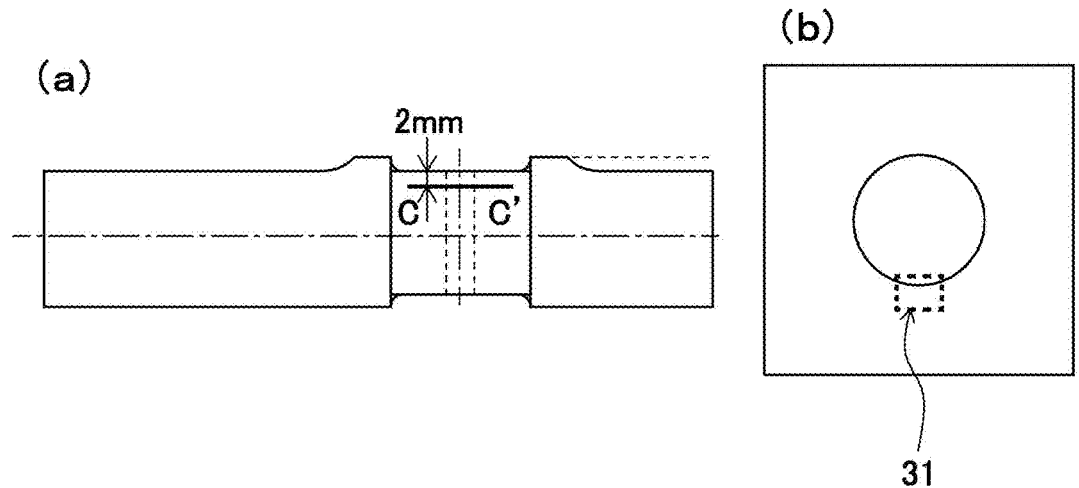
Figure 4:
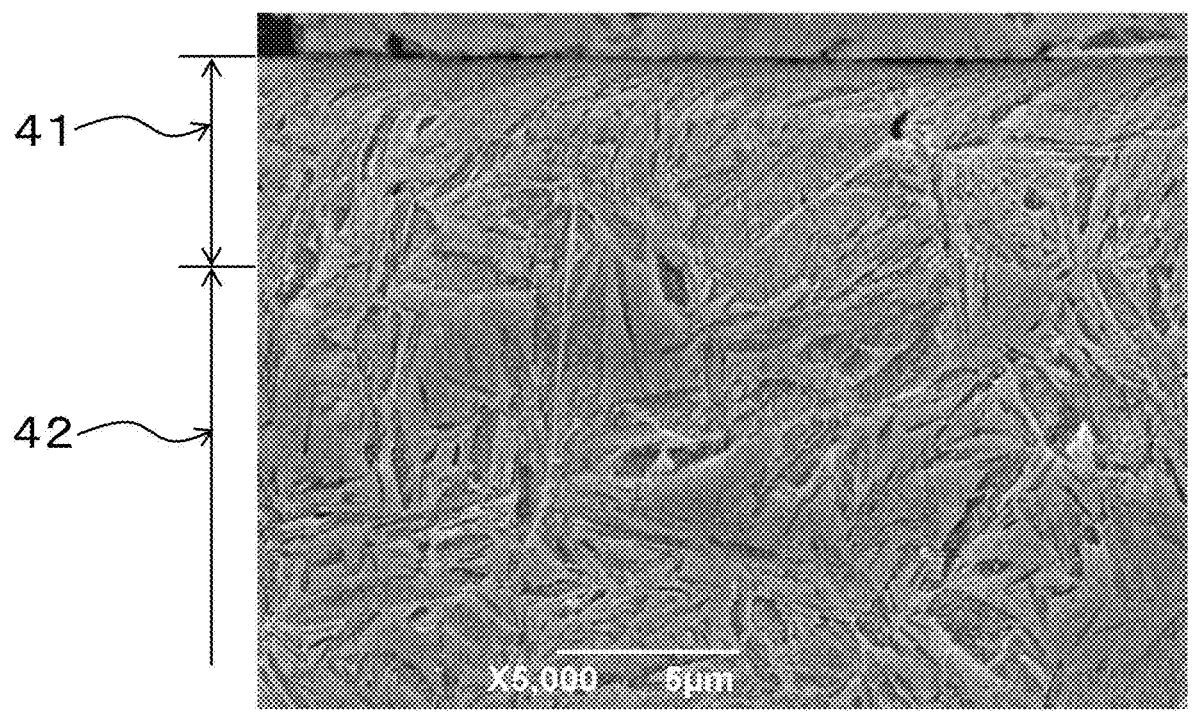
FIG. 4 is a scan electron micrograph of a surface layer of a hole at a position of a 2 mm depth from an outer circumference of the shaft part in an axial direction of a hole and at a cross-section cut vertical to the axial direction of the hole.

The plastic flow layer is a layer formed on the surface of a hole due to deformation caused by friction occurring between the cutting tool and base material when machining a hole. The thickness of the plastic flow layer at the surface of the hole is measured by the following method. A test piece is taken at a position of a depth of 2 mm from the outer circumference of a shaft part in an axial direction of the hole, and including a surface layer part of the hole in a cross-section vertical to the axial direction of the hole, so that the surface vertical to the axial direction of the hole (horizontal cross-section) becomes the observed surface (see reference numeral 31 in FIG. 3(b)). The mirror polished test piece is etched by a 5% Nital solution. The position (31) at the etched surface including the surface of the hole is observed by a 5000× power scan type electron microscope (SEM). One example of the obtained SEM image is shown in FIG. 4. In the same figure, the plastic flow layer 41 is a part where the plastic flow structure curves from the center part 42 of the base material in the circumferential direction of the surface of the hole at the shaft part (left direction to right direction at paper surface in FIG. 4).

At the time of machining, a plastic flow layer is formed due to the occurrence of large deformation at the surface layer part of a hole due to friction between the cutting tool and base material. This plastic flow layer is more resistant to deformation than the base material. For this reason, if there is a plastic flow layer with a thickness of 0.5 μm or more, the torsional strength and torsional fatigue strength of the shaft part will be improved. On the other hand, a plastic flow layer is fragile, so if its thickness exceeds 15 μm, deformation will cause cracks which will act as starting points of fracture. For this reason, an overly thick plastic flow layer will conversely cause reduction in the torsional fatigue strength of the shaft part. Furthermore, if the thickness of the plastic flow layer is over 15 the machinability of the shaft part will fall, the load on the tool at the time of machining will increase, and the tool life will remarkably fall. Due to the above reasons, the thickness of the plastic flow layer of the shaft part is limited to 0.5 to 15 μm. Note that, to further improve the wear resistance and bending fatigue strength of the shaft part, the thickness of the plastic flow layer of the surface layer of the shaft part is preferably made 1 μm or more, more preferably made 3 μm or more. Further, the preferable upper limit is 13 μm.

Figure 6:
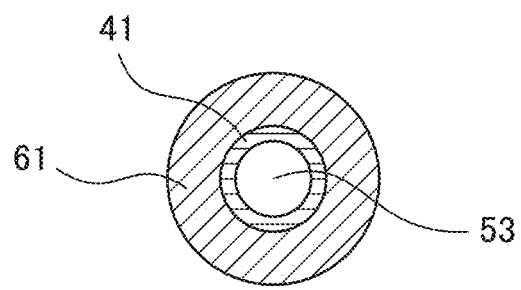
FIG. 6 is a top view of a hole formed at the shaft part.

In this way, the shaft part according to the present invention is provided with a portion excellent in strength around a hole which might cause reduction in the static torsional strength and torsional fatigue strength. Specifically, this shaft part, as shown in FIG. 6, is provided with a region with a higher ratio of deformation-induced martensite structures (also called "deformation-induced martensite layer") at a part surrounding a hole. Compared with retained austenite, deformation-induced martensite enhances the strength of the structure, so the strength of the portion surrounding a hole (position of a 20 μm depth from hole surface) of this shaft part becomes higher than the strength of the position away from the hole (position of a 2 mm depth from hole surface). For this reason, this shaft part is excellent in static torsional strength and torsional fatigue strength.

Furthermore, this shaft part may be one where the surface layer part of the hole is provided with a suitable thickness of a plastic flow layer. This plastic flow layer is also better in strength than the base material.

The shaft part according to an embodiment of the present invention is produced by the following method:

The shaft part is produced by a step of working a steel material containing, by mass %, C: 0.35 to 0.70%, Si: 0.01 to 0.40%, Mn: 0.5 to 2.6%, S: 0.005 to 0.020%, Al: 0.010 to 0.050%, and N: 0.005 to 0.025%, as impurity elements, P: 0.050% or less and O: 0.003% or less and, further, as optional elements, Pb: 0.5% or less, one or more elements selected from the group consisting of V, Nb, and Ti: 0.1% or less in total content, one or more of elements selected from the group consisting of Cr: 3.0% or less, Mo: 3.0% or less, and Ni: 3.0% or less, Cu: 0 to 0.50%, and B: 0 to 0.020%, having a balance of Fe and impurities, and having a chemical composition satisfying formula (1) to a shape of the shaft part to obtain a workpiece of the shaft part, a step of induction hardening the workpiece to obtain a hardened workpiece, in which step, the frequency at the time of the induction heating is made 10 kHz to 300 kHz, the heating time at the time of the induction heating is made 1 second to 40 seconds, and then hardening is performed, whereby a hardened workpiece with a structure at a position of a depth 2 mm from the outer circumferential surface of the hardened workpiece comprising a structure containing martensite and a volume ratio of 4 to 20% of retained austenite is obtained, and a step of drilling a hole in the hardened workpiece to obtain a shaft part, in which the tool feed at the time of drilling a hole is made over 0.02 mm/rev to 0.2 mm/rev and the cutting speed is made 10 m/min to 50 m/min, whereby a reduction rate Δγ of retained austenite found by the formula (A): Δγ=[(R1-R2)/R1]×100 from a volume ratio (R1) of retained austenite at a position of a 2 mm depth from an outer circumferential surface of the shaft part and at 2 mm depth from the surface of the hole and a volume ratio (R2) of retained austenite at a position of a 2 mm depth from the outer circumferential surface of the shaft part in an axial direction of the hole and at a position of a 20 μm depth from the surface of the hole is 40% or more:

15.0≤25.9C+6.35Mn+2.88Cr+3.09Mo+2.73Ni≤27.2   Formula (1)

wherein the contents (mass %) of the elements are entered in the notations of the elements in formula (1).

<Method of Producing Shaft Part>

The method of producing a shaft part of the present embodiment includes a step of working a steel material to a shape close to the shape of the shaft part to obtain a workpiece of the shaft part (workpiece producing step), a step of induction hardening the workpiece to obtain a hardened workpiece (hardened workpiece producing step), and a step of forming a hole in the hardened workpiece by machining and obtaining a shaft part (hole forming step).

[Workpiece Producing Step]

In this step, a workpiece having a desired shape close to the shape of the shaft part is produced. First, the steel material is prepared.

(Chemical Composition of Steel Material (Essential Constituents))

The steel material has the same chemical composition of the same contents as the shaft part according to the embodiment of the present invention explained above.

(Produce of Workpiece)

The steel material having the above chemical composition is worked to a shape close to the shape of the shaft part to obtain a workpiece of the shaft part. For the method of working it, a known method can be employed. As the working method, for example, hot working, cold working, machining, etc. may be mentioned. The workpiece has a shape similar to the shaft part according to the embodiment of the present invention at the parts other than the hole. At this stage, no hole is formed.

[Hardened Workpiece Producing Step]

The workpiece obtained in the above way is induction hardened to obtain a hardened workpiece. Due to this, in the hardened workpiece, the structure at a position of a depth of 2 mm from the outer circumferential surface of the final form of the shaft part is made martensite and a volume ratio of 4 to 20% of retained austenite.

(Induction Hardening)

The induction hardening comprises first (i) induction heating and then (ii) hardening. The induction heating and hardening are performed under the following conditions:

(i) Induction Heating

Frequency at Time of Induction Heating: 10 to 300 kHz

If the frequency is too low, the heated range widens. For this reason, the strain at the time of hardening increases. On the other hand, if the frequency is too high, the heated range concentrates at just the surface layer. In this case, the hardened layer at the surface becomes thin and the static torsional strength and torsional fatigue strength fall. Therefore, the frequency at the time of induction heating is 10 to 300 kHz.

Heating Time at Time of Induction Heating: 1.0 to 40 Sec

The "heating time" is the time from when the workpiece starts to be heated by an output of 40 kW to when water cooling is started. If the heating time at the time of induction heating is too long, the austenite grains will coarse and the static torsional strength and torsional fatigue strength of the shaft part will fall. On the other hand, if the heating time is too short, the cementite will not sufficiently dissolve and the stability of austenite will fall. For this reason, after induction hardening, a structure consisted of martensite and a volume ratio of 4 to 20% of retained austenite cannot be obtained. Therefore, the heating time of the workpiece at the time of induction heating is 1.0 to 40 sec.

Both of the heating frequency and heating time are controlled to heat the portion down to a region of a depth of 2 mm or more from the outer circumferential surface to a temperature of the $A_3$ point or more.

(ii) Quenching

The workpiece is treated by holding it at a constant temperature, then is hardened by a well-known method. The hardening, for example, can be made water quenching. Due to this, the region heated to the $A_3$ point or more changes to a structure containing martensite and retained austenite.

(Tempering)

If desiring to enhance the toughness of the shaft part, the part may be tempered after being induction hardened.

(Structure of Hardened Workpiece after End of Hardened Workpiece Producing Step)

In the hardened workpiece obtained by induction hardening under the above conditions, the structure at a position of a 2 mm depth from the outer circumferential surface of the hardened workpiece (same as outer circumferential surface of final form of shaft part) contains martensite and a volume ratio of 4 to 20% of retained austenite.

Note that, the structure at a position at a 2 mm depth from the outer circumferential surface in the hardened workpiece and 2 mm depth from the surface of a hole can be observed and the volume ratio (R1) of retained austenite can be measured by the following methods: That is, the hardened workpiece is cut vertical to the longitudinal direction of the hardened workpiece. A test piece (Test Piece 1) including a position of 2 mm from the outer circumference toward the center in the cut cross-section (FIG. 1(a), A-A', FIG. 1(b)) is prepared.

The structure at a position of a depth of 2 mm from the outer circumferential surface in the hardened workpiece is consisted of retained austenite and martensite. There are no other phases present. In observation of the structure by an optical microscope, the retained austenite is contained in the martensite. That is, in observation of the structure by an optical microscope, martensite and retained austenite cannot be differentiated. Therefore, the volume ratio (R1) of retained austenite at a position of a 2 mm depth from the outer circumferential surface and 2 mm depth from the surface of a hole is measured by the following method: The above Test Piece 1 is electrolytically polished. An electrolyte containing 11.6% of ammonium chloride, 35.1% of glycerin, and 53.3% of water is prepared. Using this electrolyte, the surface of the test piece including the reference position is electrolytically polished by a voltage of 20V.

At the surface of the electrolytically polished test piece, an X-ray is irradiated centered on a position of a 2 mm depth from the outer circumferential surface for analysis by the X-ray diffraction method. For the X-ray diffraction, a product name RINT-2500HL/PC manufactured by Rigaku is used. For the light source, a Cr tube is used. The tube voltage is 40 kV, the tube current is 40 mA, and the collimator diameter is 0.5 mm A V-filter was used to remove the K$\beta$ rays. Just the K$\alpha$ rays were used. For data analysis, the AutoMATE software (manufactured by Rigaku) was used. The Rachinger method was used to remove the K$\alpha$2 component and use the profile of the K$\alpha$1 component to calculate the volume ratio of retained austenite based on the ratio of integrated intensities of the diffraction peaks of the (211) face of the bcc structure and the (220) face of the fcc structure.

Note that, the spot size of the irradiated X-rays was made 1 mm or less.

The volume ratio (R1) of the retained austenite at a position of a 2 mm depth from the outer circumferential surface of the hardened workpiece after the end of the hardened workpiece producing step and 2 mm from the surface of the hole is 4 to 20%. This retained austenite is transformed to deformation-induced martensite at the time of machining in the next hole forming step. As explained above, in the shaft part according to the present invention, due to the deformation-induced martensite formed at the surroundings of the hole, reduction in the static torsional strength and torsional fatigue strength of the shaft part due to the presence of the hole is suppressed. If the volume ratio of retained austenite at a position of a 2 mm depth from the outer circumferential surface is lower than 4%, these effects cannot be obtained. On the other hand, if the volume ratio of the retained austenite is higher than 20%, even after machining, a large amount of soft austenite remains. For this reason, in the shaft part as a whole, excellent static torsional strength and torsional fatigue strength cannot be obtained.

[Hole Forming Step (Machining)]

The shaft part according to the embodiment of the present invention has one or more through holes or non-through holes formed vertical to or having a certain angle with respect to the longitudinal direction of the shaft part.

After induction hardening, a hole is formed in the part by machining. Due to this machining, the hole is formed while causing deformation-induced martensite transformation at the surface layer part of the hole. Due to this, reduction in the static torsional strength and torsional fatigue strength of the shaft part due to formation of the hole is suppressed and a shaft part with excellent static torsional strength and torsional fatigue strength is prepared. The machining is performed under the following conditions: Note that, as the cutting tool, for example, a carbide drill (coated carbide drill prescribed in JIS B 0171: 2014, Nos. 1003 and 1004) which is coated on the surface of a carbide alloy with a carbide, nitride, oxide, diamond, etc. can be used. Use of a coated carbide drill is effective in terms of suppressing tool wear and improving working efficiency.

Tool Feed "f": Over 0.02 mm/Rev (Revolution) to 0.2 mm/Rev

If the feed "f" is too slow, the cutting resistance, that is, the force of the tool being pushed against the machined material, is too small. In this case, sufficient deformation-induced martensite transformation does not occur. For this reason, the static torsional strength and torsional fatigue strength of the shaft part are not improved. On the other hand, if the feed is too fast, the machining resistance becomes too large. In this case, the tool is liable to break at the time of machining. Therefore, the feed "f" is over 0.02 mm/rev and not more than 0.2 mm/rev. The preferable lower limit of the feed "f" is 0.03 mm/rev. The preferable upper limit of the feed "f" is 0.15 mm/rev, more preferably 0.1 mm/rev.

Machining Speed "v": 10 to 50 m/Min

If the machining speed "v" is too fast, the machining temperature will rise and martensite transformation will be difficult to secure. For this reason, the static torsional strength and torsional fatigue strength of the shaft part will not improve. On the other hand, if the machining speed is too slow, the machining efficiency will fall and the producing efficiency will fall. Therefore, the machining speed "v" is 10 to 50 m/min. The preferable upper limit is 40 m/min, more preferably 30 m/min.

(Structure of Shaft Part)

The shaft part is obtained by the hole forming step shown above. The volume ratio (R1) of retained austenite at a position of a 2 mm depth from the outer circumferential surface of the obtained shaft part and 2 mm depth from the surface of the hole is 4 to 20%.

The reduction rate $\Delta\gamma$ of retained austenite found by the Formula (A): $\Delta\gamma=[(R1-R2)/R1]\times100$ from the above R1 and the volume ratio (R2) of retained austenite at a position of a 2 mm depth from the outer circumferential surface in the axial direction of the hole and at a position of a 20 μm depth from the surface of the hole is 40% or more.

The volume ratio (R2) of retained austenite at a position of a 2 mm depth from the outer circumferential surface in the axial direction of the hole and at a position of a 20 μm depth from the surface of the hole is measured by the following method. That is, the shaft part is cut (line B-B' of FIG. 2) vertical to the longitudinal direction of the shaft part and passing through the center of the hole to bisect the hole vertically. The surface of the hole is masked leaving open a hole of φ1 mm centered about a position of a 2 mm depth from the outer circumferential surface and electrolytically polished. The duration of the electrolytic polishing is changed to adjust the amount of polishing and form a hole of a 20 μm depth. At the center of the hole (reference numeral 21 in FIG. 2), an X-ray of a spot size of 0.5 mm is irradiated to measure the volume ratio of retained austenite using a method similar to the method of measurement of the volume ratio (R1) of retained austenite at a position of a 2 mm depth from the outer circumferential surface and 2 mm depth from the surface of the hole explained above.

The volume ratio (R1) of retained austenite at a position of a 2 mm depth from the outer circumferential surface and 2 mm depth from the surface of the hole is not a part affected by formation of the hole after hardening and may be considered the volume ratio of retained austenite before machining. On the other hand, the volume ratio (R2) of retained austenite at a position of a 2 mm depth from the outer circumferential surface in the axial direction of the hole and at a position of a 20 μm depth from the surface of the hole is the volume ratio of retained austenite near the surface formed by formation of the hole and can be considered the volume ratio of retained austenite after machining.

Accordingly, the reduction rate Δγ of retained austenite of the retained austenite before and after machining is calculated by the formula (A) based on the volume ratios (R1) and (R2) found:

$$\text{Reduction rate } \Delta\gamma = [(R1-R2)/R1] \times 100 \quad (A)$$

Looking at the volume ratio (R2) of retained austenite at a position of a 2 mm depth from the outer circumferential surface of the shaft part in the axial direction of the hole and at a position of a 20 μm depth from the surface of the hole, if the volume ratio of the retained austenite after machining is too high, hard martensite cannot be obtained and the static torsional strength and torsional fatigue strength will fall.

The reduction rate Δγ of retained austenite of the retained austenite before and after machining was 40% or more. Due to the retained austenite transforming to deformation-induced martensite by the machining, the static torsional strength and torsional fatigue strength rise. If the reduction rate Δγ of volume is too low, these effects cannot be sufficiently obtained.

EXAMPLES

Below, examples of the present invention will be given to explain the present invention more specifically. Note that, the examples are just aspects of the present invention. The present invention is not limited by the examples shown below. In the tables shown below, fields in which the requirements of the present invention are not satisfied and fields in which the desirable producing conditions of the present invention are not satisfied are shown with asterisks (*).

A vacuum melting furnace was used to obtain 150 kg amounts of molten steels A to P having the chemical compositions shown in Table 1.

TABLE 1

| Steel type | Chemical composition (unit: mass %, balance of Fe and impurities) | | |
|---|---|---|---|
| | C | Si | Mn |
| A | 0.55 | 0.11 | 1.59 |
| B | 0.70 | 0.09 | 0.80 |
| C | 0.55 | 0.12 | 2.00 |
| D | 0.41 | 0.20 | 0.70 |
| E | 0.56 | 0.11 | 0.80 |
| F | 0.55 | 0.10 | 0.79 |
| G | 0.55 | 0.30 | 0.80 |
| H | 0.56 | 0.10 | 1.59 |
| I | 0.54 | 0.10 | 1.61 |
| *J | *0.30 | 0.10 | 1.60 |
| *K | 0.60 | 0.11 | *0.40 |
| *L | 0.51 | 0.15 | *2.81 |
| *M | 0.36 | 0.14 | 0.79 |
| *N | 0.54 | *0.45 | 1.59 |
| *O | 0.55 | 0.10 | 1.20 |
| *P | 0.54 | 0.10 | 1.60 |
| Q | 0.55 | 0.10 | 0.79 |
| R | 0.56 | 0.11 | 0.80 |

TABLE 1-continued

| Steel type | Chemical composition (unit: mass %, balance of Fe and impurities) | | |
|---|---|---|---|
| | P | S | Al |
| A | 0.010 | 0.009 | 0.032 |
| B | 0.012 | 0.010 | 0.032 |
| C | 0.012 | 0.011 | 0.033 |
| D | 0.009 | 0.010 | 0.033 |
| E | 0.013 | 0.010 | 0.033 |
| F | 0.013 | 0.009 | 0.032 |
| G | 0.014 | 0.010 | 0.031 |
| H | 0.013 | 0.009 | 0.031 |
| I | 0.013 | 0.010 | 0.032 |
| *J | 0.011 | 0.011 | 0.032 |
| *K | 0.015 | 0.010 | 0.031 |
| *L | 0.013 | 0.012 | 0.032 |
| *M | 0.014 | 0.011 | 0.033 |
| *N | 0.015 | 0.011 | 0.032 |
| *O | 0.015 | 0.010 | 0.032 |
| *P | 0.013 | 0.011 | 0.033 |
| Q | 0.013 | 0.009 | 0.032 |
| R | 0.013 | 0.010 | 0.033 |

| Steel type | Chemical composition (unit: mass %, balance of Fe and impurities) | | |
|---|---|---|---|
| | N | O | Pb |
| A | 0.015 | 0.002 | — |
| B | 0.015 | 0.003 | — |
| C | 0.015 | 0.002 | — |
| D | 0.013 | 0.003 | — |
| E | 0.015 | 0.003 | — |
| F | 0.014 | 0.003 | — |
| G | 0.014 | 0.002 | — |
| H | 0.014 | 0.003 | — |
| I | 0.015 | 0.002 | 0.30 |
| *J | 0.014 | 0.002 | — |
| *K | 0.012 | 0.003 | — |
| *L | 0.011 | 0.002 | — |
| *M | 0.012 | 0.003 | — |
| *N | 0.011 | 0.002 | — |
| *O | 0.013 | 0.003 | — |
| *P | 0.014 | 0.002 | — |
| Q | 0.014 | 0.003 | — |
| R | 0.015 | 0.003 | — |

| Steel type | Chemical composition (unit: mass %, balance of Fe and impurities) | | |
|---|---|---|---|
| | V | Nb | Ti |
| A | — | — | — |
| B | — | — | — |
| C | — | — | — |
| D | — | 0.08 | — |
| E | — | — | — |
| F | — | — | — |
| G | — | — | — |
| H | 0.05 | — | 0.05 |
| I | — | — | — |
| *J | — | — | — |
| *K | — | — | — |
| *L | — | — | — |
| *M | — | — | — |
| *N | — | — | — |
| *O | — | — | — |
| *P | 0.10 | 0.10 | 0.10 |
| Q | — | — | — |
| R | — | — | — |

TABLE 1-continued

| | Chemical composition (unit: mass %, balance of Fe and impurities) | | |
|---|---|---|---|
| Steel type | Cr | Mo | Ni |
| A | — | — | — |
| B | — | — | — |
| C | — | — | — |
| D | 1.00 | — | — |
| E | 2.00 | — | — |
| F | — | 2.01 | — |
| G | — | — | 2.00 |
| H | — | — | — |
| I | — | — | — |
| *J | — | — | — |
| *K | — | — | — |
| *L | — | — | — |
| *M | — | — | — |
| *N | — | — | — |
| *O | 1.21 | 1.00 | 1.01 |
| *P | — | — | — |
| Q | — | — | — |
| R | — | — | — |

| | Chemical composition (unit: mass %, balance of Fe and impurities) | | |
|---|---|---|---|
| Steel type | Cu | B | F1 |
| A | — | — | 24.3 |
| B | — | — | 23.2 |
| C | — | — | 26.9 |
| D | — | — | 17.9 |
| E | — | — | 25.3 |
| F | — | — | 25.4 |
| G | — | — | 24.8 |
| H | — | — | 24.6 |
| I | — | — | 24.2 |
| *J | — | — | 17.9 |
| *K | — | — | 18.1 |
| *L | — | — | *31.1 |
| *M | — | — | *14.3 |
| *N | — | — | 19.1 |
| *O | — | — | *31.2 |
| *P | — | — | 24.1 |
| Q | 0.10 | — | 25.4 |
| R | — | 0.008 | 25.3 |

The molten steels of the various types of steel were used to obtain ingots by the ingot casting method. The ingots were heated at 1250° C. for 4 hours, then were hot forged to obtain diameter 35 mm round bars. The finishing temperature at the time of hot forging was 1000° C.

The round bars were normalized. The normalization temperature was 925° C., and the normalization time was 2 hours. After normalization, the round bars were allowed to cool down to room temperature (25° C.).

Figure 5:
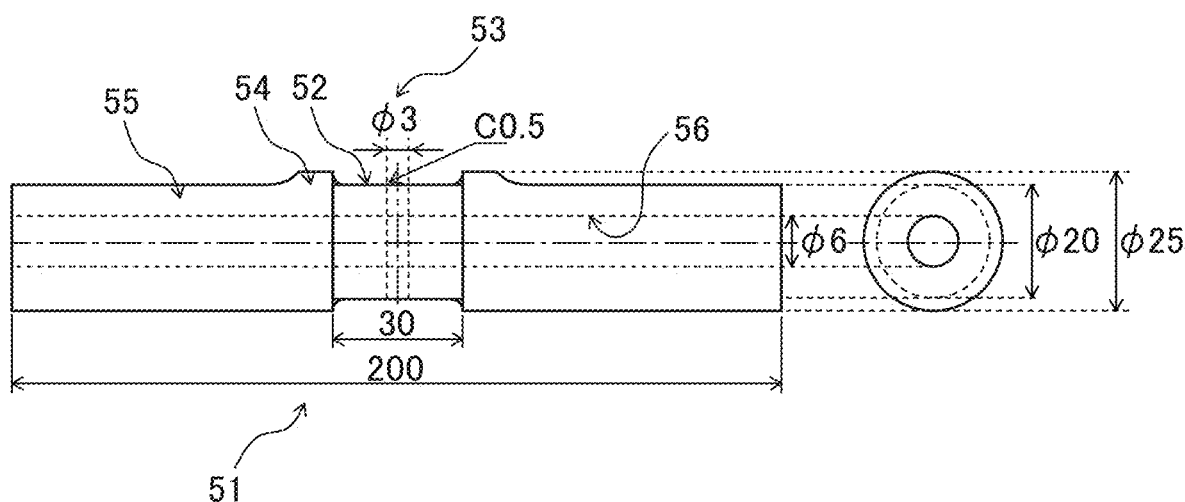
FIG. 5 is a side view of a test piece used for a torsion test.

After being allowed to cool, the round bars were machined to produce workpieces used for forming the test pieces for the static torsion test and torsion fatigue test (below, referred to as the "torsion test pieces"), that is, the torsion test pieces 51 shown in FIG. 5. In the state of workpieces, φ3 mm holes were not formed. The torsion test pieces 51 equivalent to the shaft parts are circular in horizontal cross-section and are provided with columnar shaped test portion 52, holes 53 formed at the centers of the test portion 52, columnar shaped large diameter portion 54 arranged at the two sides, and pairs of grip portions 55 obtained by removing the surfaces around the large diameter portion. Furthermore, to lighten the weights, the center of the test pieces were made hollow holes 56. As shown in FIG. 5, the overall lengths of the torsion test pieces 51 were 200 mm, the outside diameters of the test portion 52 were 20 mm, the lengths of the test portion 52 were 30 mm, the diameters of the holes 53 were 3 mm, and the diameters of the hollow holes 56 were 6 mm.

The workpieces of the torsion test pieces 51 were induction hardened by outputs of 40 kW under the conditions shown in Table 2.

TABLE 2

| Induction hardening conditions | Frequency (kHz) | Heating time (s) |
|---|---|---|
| a | 30 | 5.0 |
| b | 100 | 2.0 |
| c | 30 | 40.0 |
| *d | *400 | 5.0 |
| *e | 30 | *1.0 |

Further, the thickness of the surface hardened layer formed by induction hardening using the Steel Type A of Table 1 under the conditions "a" of Table 2 was about 2.5 mm based on the measurement values of the distance from the surface (thickness) and Vickers hardness (HV).

The workpiece of the hardened torsion test piece 51 was formed with a hole under the conditions shown in Table 3 to obtain a torsion test piece 51 equivalent to a shaft part.

TABLE 3

| Machining conditions | Feed "f" (mm/rev) | Machining speed "v" (m/min) |
|---|---|---|
| α | 0.06 | 10 |
| β | 0.12 | 10 |
| γ | 0.02 | 30 |
| δ | 0.04 | 20 |
| *ε | *0.01 | 20 |
| *ζ | 0.04 | *55 |
| *η | Oil hole was formed before hardening | |

At the time of forming the hole, as the cutting tool, a coated carbide drill with a diameter of 3 mm which is coated on the surface of a carbide alloy with a ceramic coating was utilized. Further, the front end part of a diameter 6 mm coated carbide drill with a front end angle of 90° was used to remove C: 0.5 mm at the entrance to the hole.

Further, the part formed with a hole in the above way was made the torsion test piece 51.

Further, the Vickers hardness near the surface of the hole formed using the Steel Type A of Table 1 under the induction hardening conditions "a" of Table 2 and the machining conditions α of Table 3 was 840 HV in the case of a distance from the hole surface in the thickness direction of 50 μm, 760 HV in the case of 100 μm, 710 HV in the case of 200 μm, and 695 HV in the case of 300 μm.

[Measurement of Volume Ratio (R1) of Retained Austenite]

A torsion test piece 51 was cut vertically to the longitudinal direction of the test piece 51 at a position of 2 mm depth from the surface of the hole of the test portion 52. A test piece including the position of 2 mm from the outer circumference toward the center in the cut cross-section (Test Piece 1) was prepared (FIG. 1(b)). The cut cross-section was electrolytically polished. An electrolyte containing 11.6% of ammonium chloride, 35.1% of glycerin, and 53.3% of water was prepared. Using this electrolyte, the surface including the reference position was electrolytically polished by a voltage of 20V.

The electrolytically polished surface of the test piece was analyzed by X-ray diffraction by the method explained above to find the volume ratio (R1) of retained austenite at a position of 2 mm depth from the outer circumferential surface and 2 mm depth from the surface of the hole.

[Measurement of Volume Ratio (R2) of Retained Austenite]

The shaft part was cut (line B-B' of FIG. 2) vertical to the longitudinal direction of the torsion test piece 51 and passing through the center of the hole to bisect the hole vertically. The surface of the hole was masked leaving open a hole of φ1 mm centered about a position of a 2 mm depth from the outer circumferential surface and electrolytically polished. The duration of the electrolytic polishing was changed to adjust the amount of polishing and form a hole of a 20 μm depth.

Figure 2:
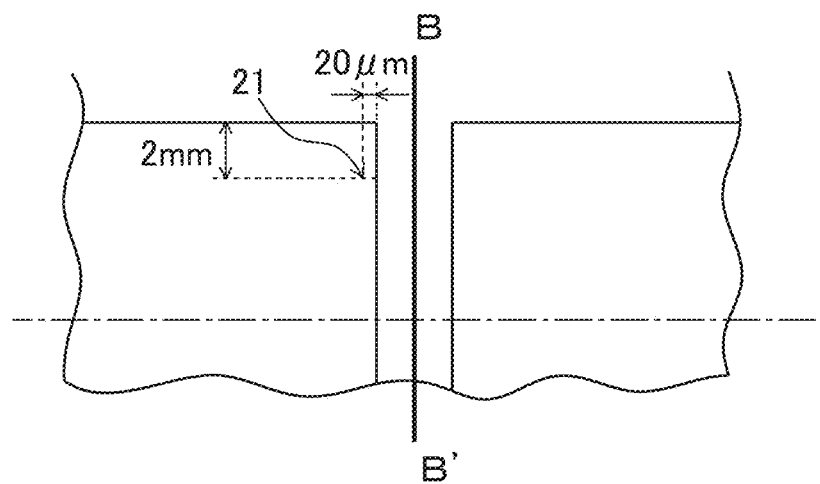
FIG. 2 is a view showing a measurement position 21 of a volume ratio of retained austenite at a position of a 2 mm depth from an outer circumferential surface and a 20 μm depth from a surface of a hole.

The hole surface was analyzed by an X-ray diffraction by the above-mentioned method to find the volume ratio (R2) of retained austenite at a 2 mm depth from the outer circumferential surface and a position of a 20 μm depth from the hole surface (reference numeral 21 in FIG. 2).

[Static Torsion Test (Measurement of Static Torsional Strength)]

The torsion test piece 51 shown in FIG. 5 was used for a torsion test by a Servopulser torsion testing machine (EHF-TB2KNM manufactured by Shimadzu) to obtain the relationship of the stress and torsion angle. Next, the maximum shear stress r at which the stress and torsion maintain a proportional relationship, the so-called "proportional limit", was defined as the static torsional strength. This proportional limit corresponds to the yield stress in a tensile test. In this test, the case of a static torsional strength of 530 MPa or more was defined as "success in an examination" in the point of having a better static torsional strength than the prior art.

[Torsional Fatigue Test (Measurement of Torsional Fatigue Strength)]

The torsion test piece 51 shown in FIG. 5 was used for a push-pull torsion fatigue test with a load maximum shear stress τ changed at a 50 MPa pitch and a repetition frequency of 4 Hz. Further, the midpoint between the minimum value ($\tau_{f,min}$) of the maximum shear stress of breakage before reaching $10^5$ repetitions and the maximum shear stress ($\sigma_{r,max}$) at the maximum point of nonbreakage by a stress lower than ($\tau_{f,min}$) was made the fatigue limit. Note that, for the test machine, the Servopulser series torsion testing machine was used. In this test, if the torsional fatigue strength is 325 MPa or more, the part has excellent torsional fatigue strength compared with the prior art, so is judged to "success in an examination".

[Test Results]

The results of the various tests explained above are shown in Table 4 and Table 5.

TABLE 4

Examples (Invention Examples)

| No. | Steel type | Heat treatment conditions | Machining conditions | Retained γ amount R1 (%) | Retained γ amount R2 (%) | Δγ (%) | Thickness of plastic flow layer (μm) | Static torsional strength (MPa) | Torsional fatigue strength (MPa) |
|---|---|---|---|---|---|---|---|---|---|
| 1 | A | a | α | 15.4 | 8.2 | 46.6 | 4.5 | 571 | 375 |
| 2 | B | a | α | 13.8 | 7.2 | 47.8 | 3.8 | 611 | 425 |
| 3 | C | a | α | 19.4 | 10.3 | 46.9 | 4.5 | 558 | 375 |
| 4 | D | a | α | 5.5 | 2.6 | 52.7 | 5.1 | 578 | 425 |
| 5 | E | a | α | 16.8 | 9.6 | 42.7 | 4.4 | 585 | 425 |
| 6 | F | a | α | 17.2 | 9.3 | 45.8 | 4.6 | 589 | 425 |
| 7 | G | a | α | 16.2 | 9.1 | 43.7 | 4.5 | 587 | 425 |
| 8 | H | a | α | 15.8 | 8.4 | 46.8 | 4.3 | 585 | 425 |
| 9 | I | a | α | 15.1 | 8.2 | 46.0 | 4.5 | 566 | 375 |
| 10 | A | b | α | 14.9 | 7.9 | 47.0 | 4.4 | 575 | 375 |
| 11 | A | c | α | 15.9 | 8.6 | 46.2 | 4.7 | 570 | 375 |
| 12 | A | a | β | 15.4 | 7.9 | 48.9 | 9.8 | 587 | 425 |
| 13 | A | a | γ | 15.4 | 8.7 | 43.3 | 3.2 | 551 | 325 |
| 14 | A | a | δ | 15.4 | 8.4 | 45.2 | 4.6 | 569 | 375 |
| 15 | B | b | β | 12.3 | 6.3 | 49.1 | 1.5 | 635 | 475 |
| 16 | D | b | α | 4.3 | 2.0 | 52.8 | 5.2 | 578 | 425 |
| 17 | D | c | α | 6.4 | 3.1 | 52.1 | 4.9 | 579 | 425 |
| 18 | D | a | β | 5.5 | 2.6 | 53.2 | 11.8 | 592 | 475 |
| 19 | D | a | γ | 5.5 | 2.8 | 49.6 | 3.8 | 558 | 375 |
| 20 | D | a | δ | 5.5 | 2.7 | 50.8 | 4.8 | 570 | 425 |
| 21 | E | b | δ | 15.0 | 8.5 | 43.5 | 4.2 | 580 | 425 |
| 22 | Q | a | α | 5.8 | 2.7 | 53.4 | 5.1 | 578 | 425 |
| 23 | R | a | α | 17.1 | 9.8 | 42.7 | 4.4 | 585 | 425 |

Further, the volume ratio (R2) of retained austenite at a position of a 2 mm depth from the outer circumferential surface in an axial direction of the hole and at a position of a depth of other than 20 μm from the surface of the hole (10 μm and 50 μm) was similarly measured under the conditions of No. 1 described in Table 4, whereupon values of 7.8% at a depth of 10 μm and 13.2% at a depth of 50 μm were obtained. Further, measurements were similarly made under the conditions of No. 4 of Table 4, whereupon values of 13.5% at a depth of 10 μm and 20.0% at a depth of 50 μm were obtained.

fatigue strength can be obtained according to the methods of production of these test examples.

REFERENCE SIGNS LIST 11 position of structural observation and R1 measurement
21 R2 measurement position
31 scan electron microscope observation position
41 plastic flow layer
42 base material
51 torsion test piece

TABLE 5

(Comparative Examples)

| No | Steel type | Heat treatment conditions | Machining conditions | Retained γ amount R1(%) | Retained γ amount R2 (%) | Δγ (%) | Thickness of plastic flow layer (μm) | Static torsional strength (MPa) | Torsional fatigue strength (MPa) |
|---|---|---|---|---|---|---|---|---|---|
| *1 | *J | a | α | 9.2 | 5.2 | 43.9 | 5.7 | *456 | *175 |
| *2 | *K | a | α | 11.3 | 7.4 | *34.2 | 4.2 | *482 | *225 |
| *3 | *L | a | α | *25.2 | *15.5 | *38.6 | 4.7 | *426 | *225 |
| *4 | *M | a | α | *3.8 | 1.8 | 52.3 | 8.3 | *476 | *125 |
| *5 | *N | a | α | 16.2 | 8.6 | 47.2 | 4.5 | 568 | *225 |
| *6 | *O | a | α | *25.7 | *16.3 | *36.5 | 4.5 | *418 | *175 |
| *7 | *P | a | α | 16.2 | 8.6 | 46.9 | 4.5 | 570 | *225 |
| *8 | A | *d | α | *1.0 | 0.3 | 68.4 | 13.5 | *354 | *125 |
| *9 | D | a | α | *0.8 | 0.1 | 82.2 | 14.2 | *338 | *125 |
| *10 | D | a | *ε | 5.5 | 4.0 | *26.5 | *0.3 | *489 | *175 |
| *11 | D | a | *ζ | 5.5 | 3.4 | *38.1 | 14.8 | *510 | *225 |
| *12 | A | a | *η | 15.4 | *15.4 | *0.0 | *0.0 | *465 | *175 |
| *14 | B | *d | β | *3.2 | 1.0 | 69.0 | 12.3 | *361 | *125 |
| *15 | C | *e | γ | *1.3 | 0.3 | 78.4 | 13.7 | *349 | *125 |
| *16 | E | b | *ε | 15.0 | 11.4 | *24.3 | *0.2 | *501 | *175 |
| *17 | F | c | *ζ | 17.0 | 10.9 | *35.9 | 13.9 | *516 | *225 |
| *18 | H | c | *η | 15.4 | *15.4 | *0.0 | *0.0 | *458 | *175 |
| *20 | *J | b | δ | 9.3 | 5.4 | 42.1 | 4.2 | *486 | *175 |
| *21 | *K | b | β | 11.5 | 7.1 | *38.6 | 10.8 | *492 | *275 |
| *22 | *L | b | γ | *25.8 | *16.6 | *35.7 | 4.5 | *430 | *225 |
| *23 | *M | b | δ | *3.6 | 1.7 | 53.6 | 8.6 | *477 | *125 |
| *24 | *N | c | β | 16.5 | 8.7 | 47.2 | 13.4 | 579 | *225 |
| *25 | *O | c | γ | *25.3 | *16.2 | *35.8 | 3.1 | *427 | *175 |
| *26 | *P | c | δ | 16.4 | 8.8 | 46.6 | 4.6 | 566 | *225 |

As clear from Table 4, in the examples in which the conditions for the method of producing a shaft part according to the embodiments of the present invention are satisfied (that is, improvement is made to the structure of the hardened workpiece after induction hardening and the structure of the shaft part after forming the holes predicated on the chemical composition of the workpiece being adjusted), it is judged that excellent results can be obtained for all of the structure of the hardened workpiece (retained γ volume ratio (R1)) and structure of the shaft part (retained γ volume ratio (R2)). Therefore, it is proved that a shaft part excellent in static torsional strength and torsional fatigue strength can be obtained according to the methods of production of these test examples.

As opposed to this, as clear from Table 5, in the comparative examples in which the conditions for the method of producing a shaft part according to the embodiments of the present invention are not satisfied (that is, the chemical composition of the workpiece has not been adjusted or no improvement has been made to at least one of the structure of the hardened workpiece after induction hardening or the structure of the shaft part after forming the holes), it is judged that excellent results cannot be obtained for at least one of the structure of the hardened workpiece (retained γ volume ratio (R1)) and structure of the shaft part (retained γ volume ratio (R2)). Therefore, it cannot be said that a shaft part excellent in static torsional strength and torsional 52 test portion
53 hole
54 large diameter portion
55 grip portion
56 hollow hole
61 deformation-induced martensite layer

The invention claimed is:
1. A shaft part
containing, by mass %: C: 0.35 to 0.70%, Si: 0.01 to 0.40%, Mn: 0.5 to 2.6%, S: 0.005 to 0.020%, Al: 0.010 to 0.050%, N: 0.005 to 0.025%, P: 0.050% or less, and O: 0.003% or less,
and further containing, as optional elements:
Pb: 0.5% or less,
one or more of V, Nb, and Ti: 0.1% or less in total content,
one or more of Cr: 3.0% or less, Mo: 3.0% or less, and Ni: 3.0% or less,
Cu: 0 to 0.50%, and
B: 0 to 0,020%,
and having a balance of Fe and impurities,
having a chemical composition satisfying formula (1):

$$15.0 \leq 25.9C + 6.35Mn + 2.88Cr + 3.09Mo + 2.73Ni \leq 27.2 \quad \text{Formula (1)}$$

wherein C, Mn, Cr, Mo and Ni in formula (1) represent a content of each element, in mass %, having a hole at an outer circumferential surface of the shaft part,
wherein retained austenite located at a position 2 mm depth from the outer circumferential surface and 2 mm depth from a surface of the hole has a volume ratio R1, wherein R1 is from 4% to 20%,
wherein retained austenite located at a position 2 mm depth from the outer circumferential surface in an axial direction of the hole and 20 μm depth from the surface of the hole has a volume ratio R2, and
wherein a reduction rate $\Delta\gamma$ is 40% or more, wherein $\Delta\gamma=[(R1-R2)/R1]\times 100$.

2. The shaft part according to claim 1, wherein the shaft part has a plastic layer at the surface of the hole.

3. The shaft part according to claim 2, wherein a thickness of the plastic flow layer is 0.5 to 15 μm.

* * * * *